United States Patent [19]

Golborne et al.

[11] Patent Number: 4,672,195

[45] Date of Patent: Jun. 9, 1987

[54] RADIANT BEAM COORDINATE DETECTOR SYSTEM

[75] Inventors: Carlos E. Golborne, Beaverton; James B. Moon, Portland, both of Oreg.

[73] Assignee: Spacelabs, Inc., Chatsworth, Calif.

[21] Appl. No.: 669,299

[22] Filed: Nov. 8, 1984

[51] Int. Cl.$^4$ .............................................. G01V 9/04
[52] U.S. Cl. .................. 250/221; 250/222.1
[58] Field of Search .................. 250/221, 222.1, 553; 340/555, 556, 557

[56] References Cited

U.S. PATENT DOCUMENTS

| | | | |
|---|---|---|---|
| 2,900,521 | 8/1959 | Eames | 250/221 |
| 3,016,421 | 1/1962 | Harmon | 250/221 |
| 3,047,723 | 7/1962 | Knapp | 250/221 |
| 3,183,499 | 5/1965 | Cowen | 250/221 |
| 3,234,512 | 2/1966 | Burkhart | 250/221 |
| 3,328,523 | 6/1967 | Treseder et al. | 250/221 |
| 3,475,029 | 10/1969 | Hyman | 250/221 |
| 3,478,220 | 11/1969 | Milroy | 250/221 |
| 3,493,754 | 2/1970 | Black | 250/221 |
| 3,508,079 | 4/1970 | Moll et al. | 250/221 |
| 3,609,713 | 9/1971 | Wooten et al. | 250/221 |
| 3,614,439 | 10/1971 | Beelik, Jr. et al. | 250/221 |
| 3,654,389 | 4/1972 | Pole | 250/221 |
| 3,727,069 | 4/1973 | Crittenden, Jr. et al. | 250/222.1 |
| 3,764,813 | 10/1973 | Clement et al. | 250/221 |
| 3,775,560 | 11/1973 | Ebeling et al. | 250/221 |
| 3,860,754 | 1/1975 | Johnson et al. | 250/221 |
| 4,061,925 | 12/1977 | van der Gaag et al. | 250/221 |
| 4,243,879 | 1/1981 | Carroll et al. | 250/221 |
| 4,267,443 | 5/1981 | Carroll et al. | 250/221 |
| 4,374,381 | 2/1983 | Ng et al. | 250/221 |
| 4,384,201 | 5/1983 | Carroll et al. | 250/221 |
| 4,467,193 | 8/1984 | Carroll | 250/221 |

OTHER PUBLICATIONS

IBM Technical Disclosure Bulletin, vol. 9, No. 5, Oct. 1966, entitled "Light Beam Matrix Input Terminal".

Primary Examiner—Eugene R. LaRoche
Assistant Examiner—Steven J. Mottola
Attorney, Agent, or Firm—Lawrence S. Levinson; Robert E. Lee, Jr.

[57] ABSTRACT

A crossed light beam coordinate detection and encoding system having a plurality of emitter/detector pairs along each axis of the display space is disclosed. The emitters are modulated in amplitude and the detectors are biased with a low load resistance to provide a wide dynamic range. The wide dynamic range and amplitude modulation detection provides immunity to unwanted interference. After band pass filtering, the carrier is amplified by high gain amplifier with auto bias control. The output of the amplifier generates a true/false output corresponding to the presence/absence of a beam. A single chip microprocessor controller checks the screen for interrupted beams and when not clear generates coordinates of the interrupted beams. The coordinates can be calculated as a weighted average of the interrupted beams for each axis or as the min and max coordinates along each axis. Reporting is done repeatedly at preselected time intervals. Error information is generated each time the coordinates are generated to report errors such as too large or too small an object or a discontinuous object. Repeated reportings beyond the initial reporting of a coordinate of the interrupted beams can be locked out in response to the position of the interrupted beams in the display space. Diagnostics of the system can be performed at 100% and 90% output levels of the emitters. This allows diagnostics to detect marginal operation of the screen.

10 Claims, 8 Drawing Figures

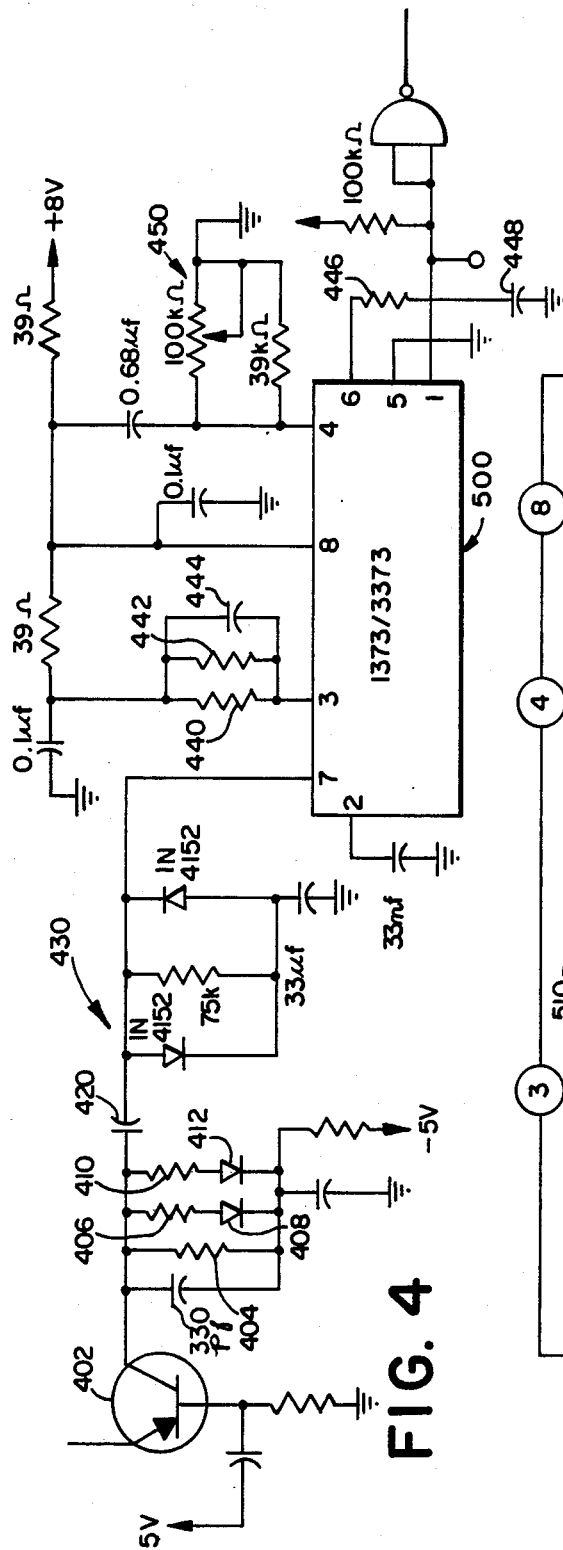
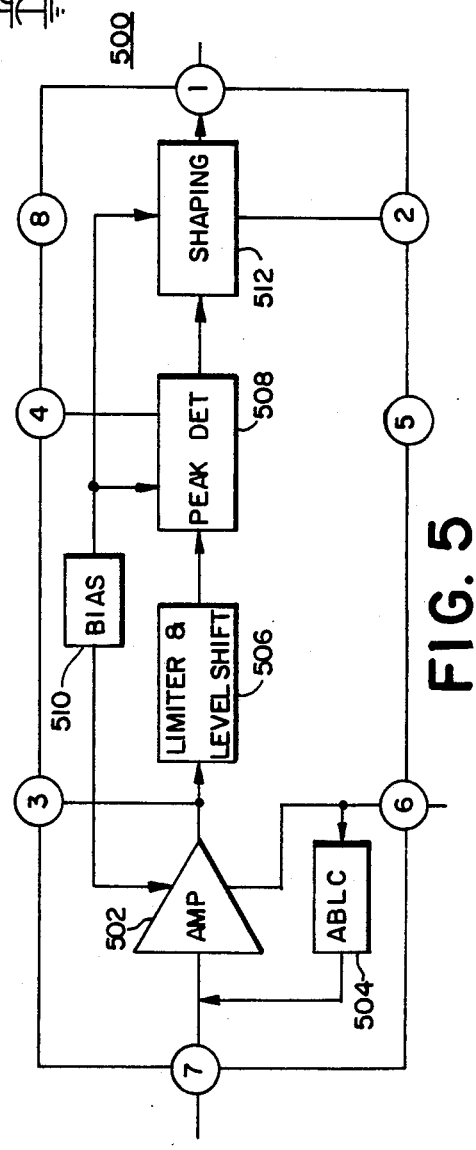
FIG. 4
FIG. 5

RADIANT BEAM COORDINATE DETECTOR SYSTEM

BACKGROUND OF THE INVENTION

The present invention relates to a radiant beam coordinate detection system, more particularly, to a crossed infrared beam coordinate detection system.

Crossed infrared beam X-Y coordinate detection and encoder systems are well known in the art. See U.S. Pat. Nos. 3,764,813; 3,775,560; 3,860,754; 4,243,879; 4,267,443; and 4,384,201, for example. Typically in these systems x and y coordinate arrays of paired infrared light sources and detectors are caused to scan a display surface with crossed light beams by an electronic scanning system. When any of the beams are interrupted the prior art detection systems are equipped for determining the position of the interrupted beams.

Problems encountered in the design of a crossed radiant beam coordinate detection system such as those described above include: ambient light interference which produces radiation in the IR spectrum that can interfere with operation of the system; wide variation in performance of optoelectronic devices due to differences in optical and mechanical axes; aging of emitters which reduces their output; scattering, reflection, and attenuation effects due to the housing used for mounting the emitter/detection pairs; and the optical alignment of emitters/detectors.

U.S. Pat. Nos. 3,764,813, 3,775,560 and 3,860,754 disclose systems in which the arrays of emitters and detectors are electronically sequentially scanned. This helps reduce problems due to emitters/detectors being non-aligned and the effects of scattering, reflections etc. U.S. Pat. No. 4,243,879 discloses a means for compensating for a light fluctuations in the performance of crossed beam coordinate detection and encoding systems, while U.S. Pat. No. 4,267,443 and 4,384,201 disclose among other things a means for determining the relative size or center line of the object which is interrupting the beams.

Despite the advantages of the above described systems a need still exists for an improved crossed beam coordinate detection and encoding system which addresses the above problems with greater flexibility.

SUMMARY OF THE INVENTION

An object of the present invention is to provide an improved crossed beam coordinate detector and encoding system which provides for greater flexibility of performance.

The present invention relates to a crossed radiant beam x-y coordinate detection system. The crossed radiant beams in the preferred embodiment are provided by a plurality of emitter and detector pairs located along each axis of a display space. The crossed infrared light beams are amplitude modulated and caused to scan the display space. Means are provided for detecting an interruption of the crossed light beams in response to the presence or absence of the amplitude modulation.

The detectors are operated over a wide dynamic range and this in combination with the envelope detection of the amplitude modulation provides means for eliminating ambient light interference as long as the detectors are operated within their dynamic range. The output of the envelope detector is coupled to a high gain amplifier which helps to compensate for tolerance and aging of the electronic components and inherent misalignment problems.

The present invention further relates to a crossed radiant beam x-y coordinate detection and encoder system that includes a plurality of emitter and detector pairs along each axis wherein the crossed light beams are caused to scan a display space and means are provided for detecting the interruption of the light beams. Further, the system comprises means for repeatedly reporting coordinates associated with the interrupted light beams which are present over a series of display space scans, the reporting taking place over preselected scan intervals. In the preferred embodiment, two scanning intervals are provided; an initial scan interval of time T1; and subsequent scan intervals of time T2.

The reporting means further comprises reporting immediately when the interrupted beams have disappeared. However, the system includes means for locking out the repeated reportings of the continuously present interrupted beams and the disappearance of interrupted beams beyond the initial reporting of the coordinates of an interrupted beam as they first occur, the locking out means operating in response to the position of the interrupted beams in a selected display space.

The reporting means of the detection and encoding system further includes means for reporting the minimum and maximum coordinates of the interrupted beams for each axis and for reporting the average x and y values of the interrupted beams. Means are further provided for reporting an error when the interrupted beams along either of the axes are either too small or too large based on the min and max or average values reported.

The coordinate detection encoding system of the present invention further comprises a diagnostic means for checking the operation of each emitter/detector pair and for checking the scan speed of the system. Further, the checking of the emitter/detector pairs can take place at either a normal power level or at a reduced emitter power level to check for marginal performance.

BRIEF DESCRIPTION OF THE DRAWINGS

FIG. 4 is a more detailed block diagram of a receiver circuit portion of the system of FIG. 1.

FIG. 5 is a more detailed block diagram of an amplifier portion of the receiver circuit of FIG. 4.

DETAILED DESCRIPTION OF THE DRAWINGS

Figure 1:
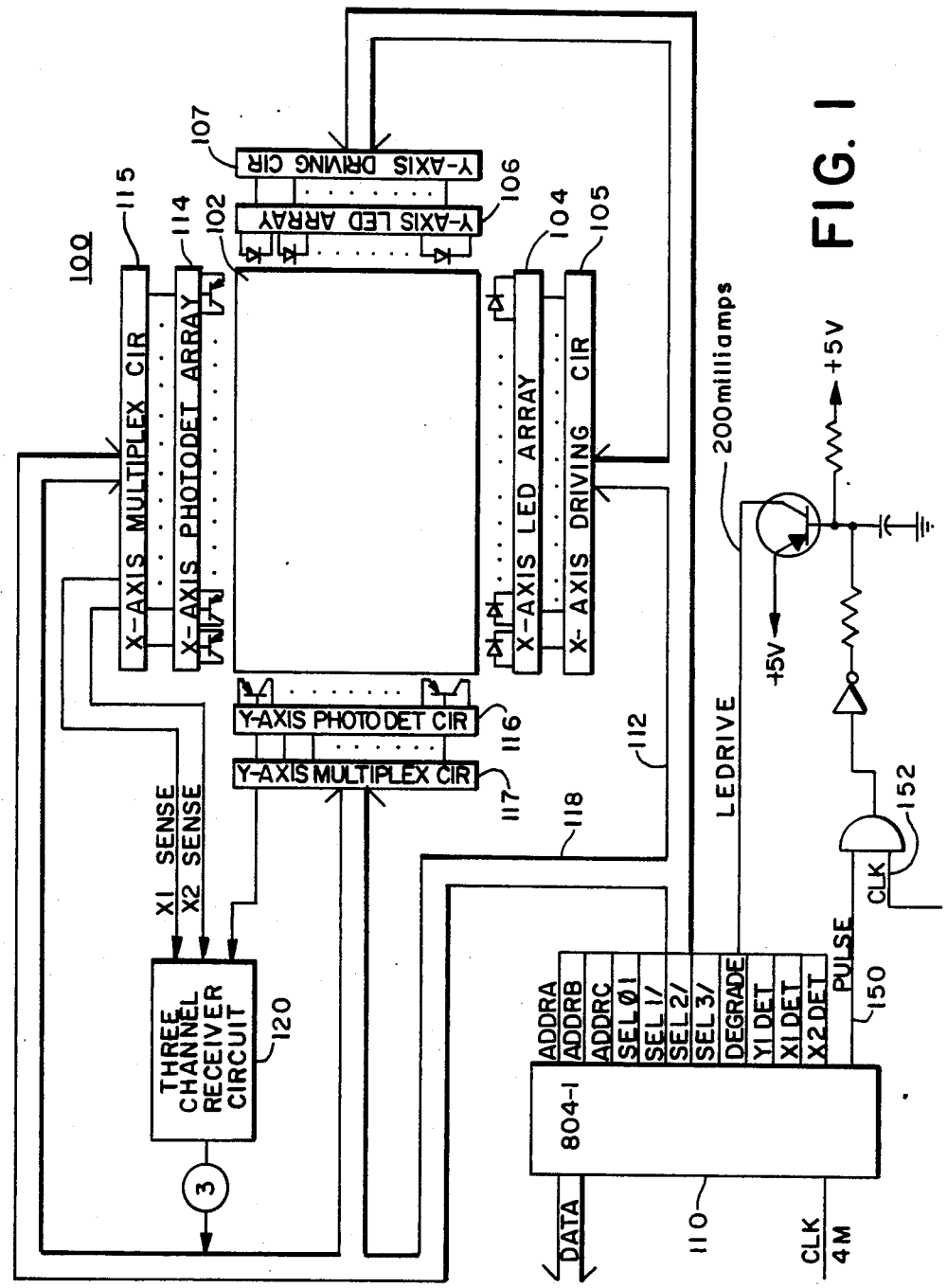
FIG. 1 is an overall block diagram of the present invention crossed beam coordinate detection and encoding system.

Referring to FIG. 1, a preferred embodiment crossed beam coordinate detector and encoder system designated generally 100 is shown. It comprises a display space 102 to be scanned by the crossed beams generated by the x-axis array of LED emitters 104 and corresponding driving circuit 105 lying along one side of the display space 102 and the y-axis array of LED emitters 106 and corresponding driving circuit 107 lying along another side of the display space 102, all under the control of the microprocessor controller 110 via bus portion 112. In the preferred embodiment there are forty-eight LED's along the x-axis and 32 LED's along the y-axis, although almost any number of LED's can be used depending on the design requirements of the system.

The system comprises a corresponding array of 48 photodectors 114 and corresponding multiplexer circuit 115 lying parallel to the x-axis array of LED's 104 on an opposite side of the display space 102 therefrom. Similarly, there is an array of 32 y-axis photodetectors 116 and corresponding multiplexer circuit 117 lying parallel to the y-axis array of LED's 106 on an opposite side of the display space 102. The photodetectors and multiplexing circuits of each array are controlled by controller 110 via bus portion 118. The LED's and photodetectors of each parallel array are paired together.

The interruption of a beam or beams during scanning is detected by a receiver circuit 120. Detection of interrupted beams by the receiver circuit is transmitted to the controller 110 by the bus portion 118.

Figure 2:
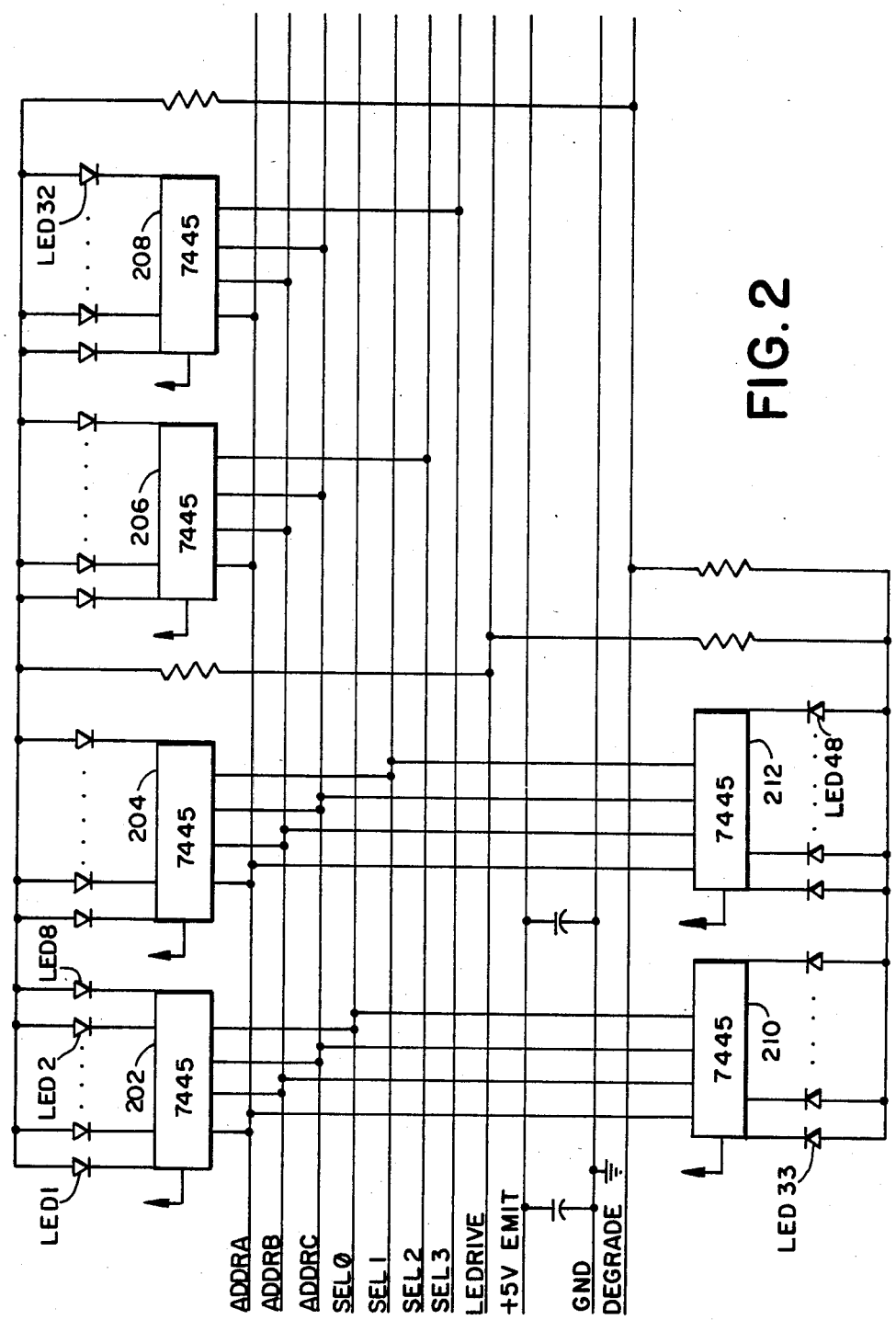
FIG. 2 is a more detailed block diagram of a light emitting and associated driving circuit portion of the system of FIG. 1.

Referring now to FIG. 2, the x-axis LED array and driving circuit comprises 48 LED devices LED1 to LED48, and decoder driver circuits even numbers 202 through 212. These are standard TTL 7445 devices. There are six decoder driver circuits, each are coupled to eight of the LED's, e.g. decoder driver circuit 202 is coupled to LED1–LED8. Each of the decoder driver circuits 202 through 212 receive three address lines ADDRA, ADDRB and ADDRC from the controller in 110 (an Intel 8041 microprocessor controller in the preferred embodiment) over the bus portion 112. The three address lines define which of the eight LED's attached to the decoder driver circuit will be activated. Signals SEL0/,SEL1/,SEL2/ and SEL3/ from the controller 110 are used to select which decoder driver circuit is enabled. These select signals are active low and only one signal is active at a time.

The y-axis LED array 106 and driving circuit 107 is similar in design. The same address and select signals as described above are simultaneously transmitted to the y-axis driving circuit 107 and LED array 106. However, since in the preferred embodiment there are only 32 y-axis LED's only four decoder driver circuits are used. It can be seen from FIG. 2 that when either SEL0/ or SEL1/ are active there will be two x-axis LED's on for each y-axis LED. When SEL0/ is active low both circuits 202 and 210 are enabled while circuits 204 and 212 are enabled when SEL1 is low. For example, when LED1 is active so is LED33 and so on as when LED16 and LED48 are activated. Thereafter during the remaining part of the scan (LED17–LED32) only one x-axis LED is activated for the corresponding y-axis LED. This accomodates a scan of a 32×48 array in a shorter amount of time.

Figure 3:
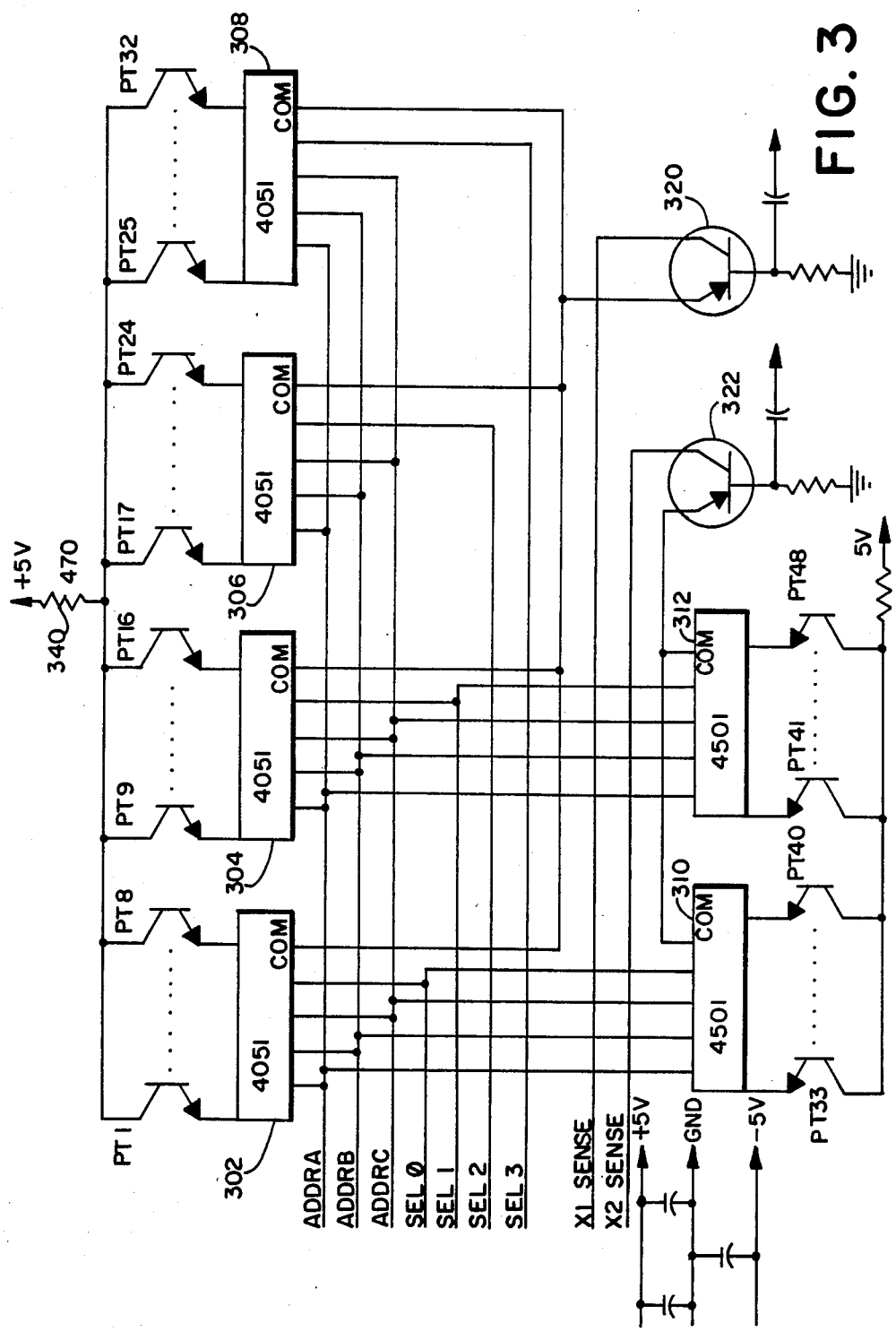
FIG. 3 is a more detailed block diagram of a detector circuit portion of the system of FIG. 1.

Correspondingly, the address and select signals are transmitted simultaneously along bus portion 118 to both the x-axis multiplexer circuit 115 and the y-axis multiplexer circuit 117. Referring to FIG. 3, the x-axis multiplexer circuit is shown in detail. An array of 48 phototransistors PT1–PT48, are shown coupled to six multiplexer circuits even numbers 302 through 312. Suitable multiplexers are made by RCA with the model no. 4051. Multiplexers 302 through 308 have their common output line coupled together to the emitter of transistor 320 while the common output of circuit 310 and 312 are coupled to the emitter of transistor 321.

When a particular LED of the x-axis LED array is activated a corresponding phototransistor is multiplexed onto one of the two common output lines and transmitted to the emitter of either transistor 320 or 322. For example, when LED's 1 and 33 are fired simultaneously, the multiplexer circuits 302 and 310 make the outputs of phototransistors PT1 and PT33 available to the emitter of transistors 320 and 322, respectively. The collector outputs of the transistors 320 and 322 are coupled via lines X1 Sense and X2 Sense, respectively, to the receiver circuit 120.

Similar circuitry is used with the y-axis phototransistor array 116 and multiplexer circuit 117 except that there are only 32 phototransistors and four multiplexer circuits. Their common output is coupled to the emitter of transistor 402 in FIG. 4 whose collector output is provided as a Y1 sense signal to receiver circuit 120.

Remembering the description of FIG. 2, the controller 110 through the select lines enables one of the decode driver circuits (or a pair of circuits if SEL0/ or SEL1/ is low for the x-axis driver circuit 105) and through the three address lines chooses a particular LED of the eight coupled to the enabled decode driver circuit to be activated for each axis. Then the controller turns on the chosen x and y emitters by generating a high pulse signal 150 in FIG. 1 and modulating it with a 29 kHz clock 152. This signal is coupled to the base of transistor 160 and its collector provides a 29 kHz modulated LED drive signal over bus portion 112 to the LED's of both the X and Y axis arrays 104 and 106, respectively. See the LEDRIVE line in FIG. 2. By designing an appropriate envelope detector receiver circuit this 29 kHz carrier helps to alleviate all types of inter including ambient light interference.

Referring now to FIG. 4, a more detailed schematic of one channel of the three channel receiver circuit 120 of FIG. 1 is provided. All three channels are substantially the same so the Y1 channel is chosen as representative. The emitter current of the chosen phototransistor of the x-axis array 106 and multiplexer circuit 107 is coupled to the emitter of transistor 402 as described before. The collector of the phototransistor for both the x-axis and y-axis arrays 114 and 116, respectively, are coupled through a relatively small 470 ohm resistor to a 5V source. This provides a wide dynamic range in response to incoming light levels resulting in high immunity to high levels of ambient light by avoiding saturation of the phototransistor. Transistor 402 has a grounded base which provides the speed required by the 29 kHz carrier and additionally provides amplification at low levels of ambient light.

A voltage swing is developed across 9.1 K load resister 404 which swings from a negative voltage when there is no light on the chosen detector, that is, when the beam is interrupted, to near 5 volts when the detector saturates. However, to avoid DC saturation at the collector, to compensate for the increased sensitivity of the detector, and to limit the switching spikes generated by the multiplexers, a non-linear load is added in parallel with resistor 404 to the collector load. This non-linear load comprises 220 ohm resistor 406 in series with a 1N4152 silicon diode 408 and 620 ohm resistor 410 in series with a G866 germanium diode 412. These two parallel resistor-diode pairs tend to clamp the output voltage when the detectors receive more light and during multiplexer switching.

The voltage developed on the collector of transistor 402 is AC coupled via 1 nanofarad capacitor 420 to the analog integrated circuit (IC) amplifier designated generally 500 and described in more detail in connection with FIG. 5. The capacitor 420 blocks the 60 or 120 Hz component generated by artificial ambient light but allows the 29 kHz carrier through. The signal from the collector of transistor 402 after passing through capacitor 420 is coupled to pin 7 of IC amplifier 500. The diode and RC network coupled to pin 7 further reduces multiplexer spikes by clamping to the average input.

The IC amplifier 500 was designed to detect the presence or absence of infrared carriers, in particular, in remote control applications. It is available from NEC, Model No. 1373, or Motorola, Model No. 3373. It comprises an 80 dB amplifier 502 with automatic bias control 504, followed by a limiter 506, a peak detector 508 with threshold adjustment, and output shaping 512. The gain of the IC amplifier 500 is defined by the ratio of the impedance of the load at pin 3, divided by the impedance at pin 6. The IC amplifier 500 can operate on wide band (with resistive loads), or narrow band (with tuned circuits). In the tuned embodiment a tuned circuit comprising a parallel 430 ohm resistor 440, an inductor 442, and a 2.2 nanofarad capacitor 444 are provided in FIG. 4. In the preferred embodiment, however, a resistive load is provided by removing inductor 442. The load at pin 6 is a 3.9 ohm resistor 446 coupled to ground through 4.7 microfarad capacitor 448.

The output of the peak detector is compared at pin 4 in FIG. 5 with a fixed threshold set by the circuit 450 in FIG. 4. After passing through the shaping circuit 512 the output of the circuit 500 on pin 1 is converted to a TTL compatible signal and buffered by gate 460. This output, YDET, is high/low corresponding to the presence or absence of a beam.

Two additional receiver channels like the one described above in connection with FIGS. 4 and 5 are provided for the X1 Sense and X2 Sense signals received from the collectors of transistors 320 and 322 in FIG. 3. The only difference is the selection of the values for the 330 picofarad and 9.1 K resistor 404 coupled to the collectors of 402. In the X1 and X2 Sense channels these values are 820 picofarads and 4.7 K ohm, respectively. These values are different because the distance between the y axis LED's and associated detectors is greater than the distance between the x-axis LED's and detectors therefore requiring different sensitivities in their respective receiver channel circuits.

A DEGRADE line is provided over bus portion 112 from controller 110 to the x and y emitter arrays and driving circuits. This line is coupled through a 180 ohm resistor to the light emitting diodes, for example diodes LED1-48 from the x-axis array 104. When the controller activates this line it produces a lower drive for the LED's for evaluating degradation of the LED's due to aging.

The low 470 ohm load resistance 340 on the detectors PT 1-48 provides a fast response time and wide dynamic range. The use of an AM carrier (29 kHz modulation by clock 152 and use of receiver channel 120) virtually eliminates ambient light interference as long as the detectors are within their dynamic range. The use of a high gain (80 dB) AC amplifier with auto bias control (IC amplifier 500) absorbs overall losses and variations due to the optical link and components, aging of the emitters, and variations in assembly.

Figure 6:
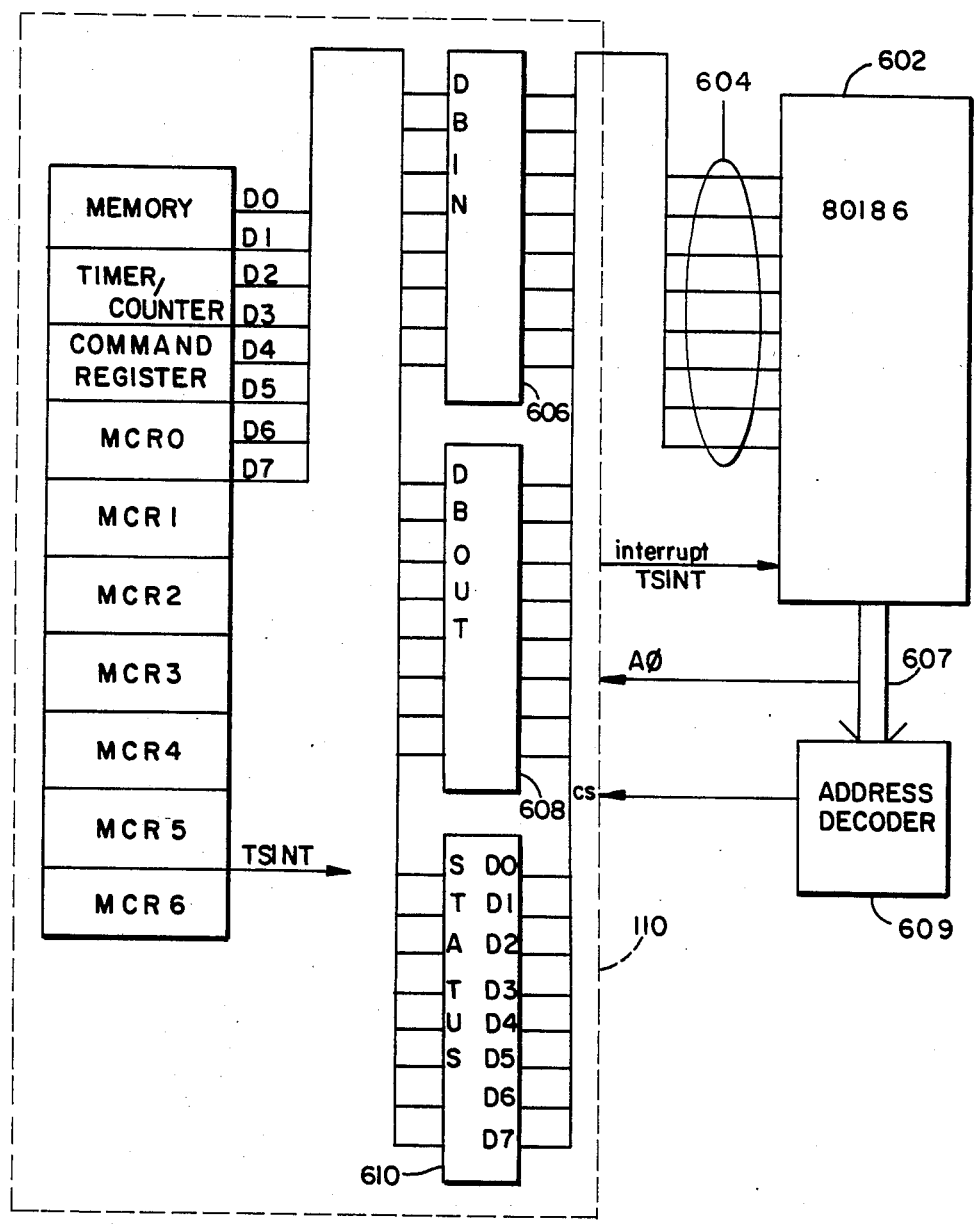
FIG. 6 is a block diagram showing a microprocessor controller portion of the present invention of FIG. 1 coupled to a main processor portion over a bi-directional 8 bit bus.

Referring to FIG. 6, as mentioned earlier, a single chip peripheral microprocessor 110 is used to control the system 100. Controller 110 communicates to a main processor 602 (an Intel 80186) on a bidirectional 8 bit bus 604. The controller 110 has several internal registers (MCR0-MCR6) that define the operating environment and system parameters: screen size and format, repetition rates, scanning speed, operating mode, etc. These registers can be changed by the main processor 602 at any time. The controller 110 can perform any of four operations: normal screen scan, internal registers dump, diagnostics on the controller or the system, and a do nothing.

The controller 110 has 64 bytes of RAM and 1 K bytes of ROM plus an 8 bit internal timer/counter. It communicates with the main processor 602 on the low byte of the main processor's data bus (D0 to D7) through a set of three registers: DBIN 606; DBOUT 608; and STATUS 610.

The main processor 602 writes to DBIN 606 which sends an interrupt to controller 110 and sets the flag IBF by D1 in the STATUS register 610. The flag IBF will be cleared when the controller 110 reads the data. The content of DBIN 606 can be interpreted as command or data depending on the state of $A\phi$ of the system address bus 607 at write time which is copied into controller flag register F1. ($A\phi=0$ means data.) The address bus 607 from processor 602 is coupled to controller 110 via decoder circuitry 609.

The data output register 608 when written into by the controller 110 generates an interrupt TSINT to the main processor 602 and sets flag OBF corresponding to D0 in the STATUS register 610. The flag is cleared when the processor 602 reads the DBOUT register 608. The status register can be read by the main processor 602 at any time, but it is a write only for controller 110.

The tasks assigned to controller 110 are to provide coordinates of an object that intercepts the beams of the coordinate detection system 100, and to perform diagnostics of the system. Since in general a finger or other stylus used to interrupt beams will interrupt more than one beam along both the x and y axes, coordinates are calculated as a weighted average or as the min/max position of the beams interrupted by the object. The MCR5 register of controller 110 defines the minimum and maximum number of beams which must be intercepted in order to generate valid coordinates for both the x and y axes. It also defines whether average coordinates (one xy pair) or max and min coordinates (two xy pairs) are to be reported.

Register MCR6 defines which of the previously enumerated modes the system is in. For example, the format for MCR6 in the normal mode is as follows:

| D7 | D6 | D5 | D4 | D3 | D2 | D1 | D0 |
|----|----|----|----|----|----|----|----|
| *  | *  | *  | 0  | 1  | 1  | 1  | 0  |

The meaning of the * bits in the normal mode is:

| | |
|---|---|
| standard normal mode | 0 0 0 |
| restart (from T1) | X X 1 |
| lockout | X 1 X |

(An x bit indicates a do not care state.) Restart and lockout will be described below. In general in the normal mode of operation, after detection of an object, the coordinates of the interrupted beams are generated from knowledge of the address lines, select lines and value of the X1, X2 and Y1 Detect lines. Scanning continues but new coordinates are not reported until after a T1 time delay has occurred. This includes not reporting the coordinates of interrupted beams upon subsequent scans if they are still present, unless the interrupting object is withdrawn and then this is reported. Coordinates will be reported at T1 and thereafter at a T2 rate. Values of T1 and T2 are loaded into MCR1 and MCR2, respectively, by the processor 602.

For some keyboard commands, the operator keeps his finger in place until a particular value such as an alarm level has been incremented or decremented to a desired level. That is why coordinates are reported every T2 seconds after the first T1 interval. However, other keyboard commands are not intended as repeat functions and the main processor does not wish to be interrupted by reporting of coordinates associated with those commands after the initial report. In such an instance the processor 602 issues a lockout command which means no further coordinates are to be reported until an "object gone" and "new object" are reported.

Figure 7A:
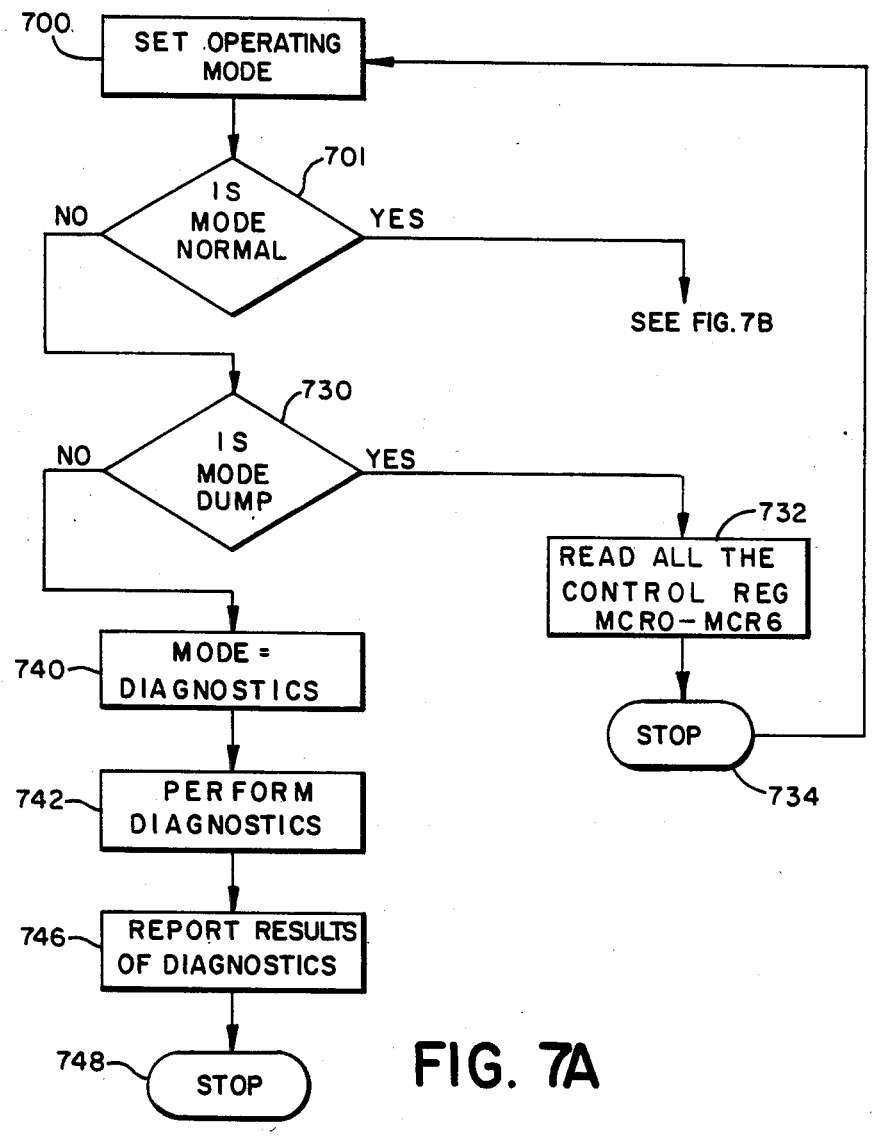
FIGS. 7A and 7B are a block diagram of a program for controlling the system of FIG. 1.
Figure 7B:
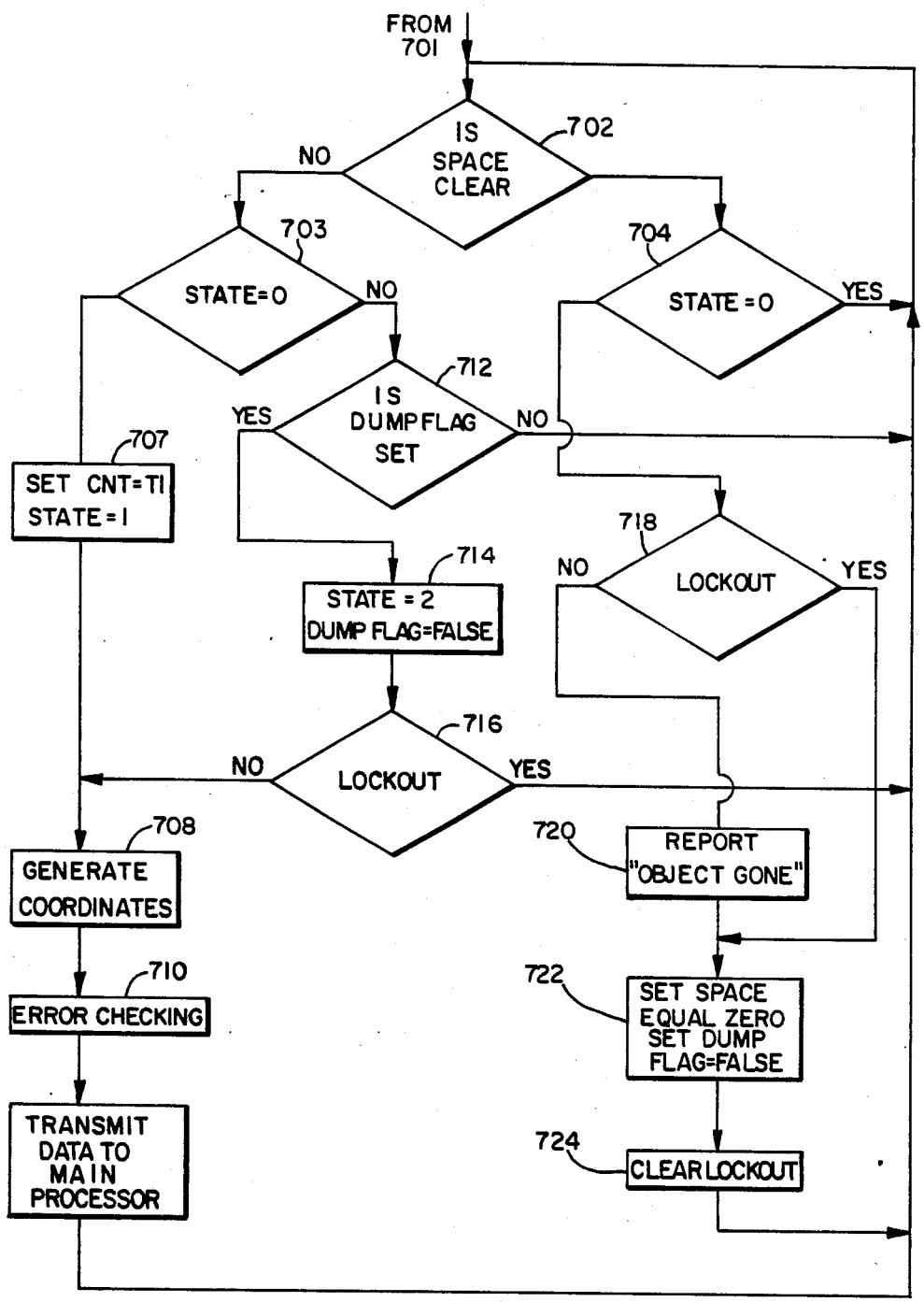

Referring now to FIGS. 7A and 7B, a more detailed description of the normal mode of operation 701 is provided. Initially, the system is cleared of any interrupted beam reports and a state flag is set to 0. A quick scan of the display space is accomplished and if the space is clear of any interrupted beams 702 and the state is still zero 704, the process of looking for interrupted beams begins again.

Upon subsequent scans if interrupted beams are first detected at 702 and the state is still zero 703 (that is, there had been no display space activity in the prior scan), then the state flag is set to 1 and a delay count is set to T1 707, the value loaded in MCR1. Coordinates of the interrupted beams are generated 708 and error checking 710 is performed.

Error checking is performed by the controller 110 wherever coordinates are generated to determine if the object is discontinuous along the x or y axis, i.e. not all beams are interrupted between the min and max coordinates reported, or that the object is too small or too big in the x or y directions. It does the latter by comparing the number of beams intercepted along each axis with the min and max values stored in MCR5.

Next, the data along with the error byte is transferred 711 to the main processor 602. When reporting average coordinates, the sequence of transfer is ERROR - BYTE, X, and Y. In the max/min mode the range of values is 0 to 47 for X, and 0 to 31 for Y. The output sequence is ERROR - BYTE, MAXX, MAXY, MINX and MINY. The data when transferred to the processor 602 is flagged with a byte number indicated at D4, D5 and D6 in the status register. During data transfer scanning of the display space is stopped.

Following the data transmission, when the controller 110 receives a data acknowledge from processor 602 the program begins again at 702 to see if the screen is clear. If the answer is still no then at 706 the state flag is observed and in the previous loop it had been set to one. Then inquiry is made at 712 whether the dump flag is set. This flag is controlled by the internal timer/counter of the controller 110 set at 707. The dump flag is set at time T1 after the initial generation of coordinates. If time T1 has not elapsed then the controller does nothing and the program returns to begin.

Assuming on subsequent passes the screen is still not clear and the state is still 1, the dump flag will be set at time T1. At time T1, the state is set to 2 and the dump flag is set false 714. If a lockout command is not present 716 then the coordinates are generated anew 708, error checking is performed 710 and the data transmitted to the processor 602. This process will continue as long as the object is present, but the dump flag will be set at time intervals T2 thereafter.

If a lockout is present at 716 then instead of new coordinates being generated the program returns to begin.

At some point in time at 702 the screen will be clear but the state will not be zero at 704. If no lockout is present at 718, then a report will be made to the main processor 602 that the object is gone 720. After this the state will be set to zero, the dump flag set false 722, and lockout command cleared 724. The program will return to begin. If a lockout is present at 718 the step of reporting the "object gone" 720 is bypassed.

Some of the mode control registers were described above (MCR1 for T1; MCR2 for T2; MCR5 instructions for beam coordinate calculation and error checking; and MCR6 for operating mode). MCR0 defines the display space format, while register MCR3 is used for diagnostics.

The control registers are set by a command from the processor 602 set in DBIN. After checking the IBF flag the controller 110 loads the command in a command register. The number of the control register to be set is set in the lower three bits of a command. Except for MCR6, commands for setting the register are followed by a data byte. MCR6 is set by the upper bits of the command byte thereby limiting this most frequent command to one byte, minimizing the main processor overload.

Operation of the normal operating mode and the significance of the lockout and restart commands in response to the command bytes in MCR6 was described above. The other mode of significance for purposes of the present invention is the diagnostic mode. First a diagnostics command byte is sent to the command register. The format is:

| D7 | D6 | D5 | D4 | D3 | D2 | D1 | D0 |
|---|---|---|---|---|---|---|---|
| # | X | X | 1 | 1 | 1 | 1 | 0 |

Bit # when set selects diagnostics for the controller, otherwise the diagnostics are to be performed in the coordinate detection system.

Following the diagnostics command byte a data byte defining the diagnostics to be performed is loaded into the MCR3 register. This register defines the axis under test, the emitter/detector pair to be tested and indicates if the test is performed in the degraded mode using the DEGRADE signal. In the degrade mode a particular emitter/detector pair is tested at 90% of emitter output.

Then the scanning rate is checked. Scanning is the delay time between the time a pair is selected and the time at which the state of the scan line is read. The desired scanning rate is defined by control register MCR4. In the preferred embodiment the delay between placing an address and reading the state of the detect line is 900 microseconds. This number is as fast as possible to reduce response time, but slow enough to operate reliably. The processor 602 can change the MCR4 setting to test marginal operation.

As a result of a diagnostic test a two byte report is sent to processor 602 via DBOUT. The first byte reports on diagnostics performed on the controller while the second byte reports on emitter detector failure at normal or degrade state.

To perform diagnostics, the main processor 602 will have to DUMP the internal registers to read MCR0 and MCR4. MCR0 defines the screen format, and has to be used to generate a valid bit pattern on MCR3. An invalid pattern will cause an invalid error report. The default screen format for the present invention defines a screen size of 32 (Y) by 48 (X) pairs. All elements on the Y axis are detecte on Y1DET. However on the X axis elements 1 to 3 are detected on X1DET line, and elements 33 to 48 are detected on X2DET. As the address is only 0 to 31, to address pair #33, the address must be 0 and X2DET selected.

As mentioned previously MCR0 defines the display space 102 format. The space is divided in a number of areas that are scanned simultaneously. The size of the area and range of validity for X2 Det and Y1 Det can be redefined by the register. A single data byte defines the space format as follows:

| area size | (3 to 32) | D0 to D3 |
| valid range for X2D | (3 to 16) | D3 to D4 |
| size of Y on Y axis | (3 to 32) | D5 to D7 |

At the end of any report from the controller 110 (e.g. coordinates, diagnostics, register dump) the byte number on the status register goes to zero, and a dummy data byte from the processor 602 is expected, as a handshake (data is don't care). The handshake assures that the main processor 602 will not be interrupted with a new set of coordinates etc., before it is ready for them. The controller 110 will be on a do nothing loop until this byte is received.

Referring back to FIG. 7, the main processor 602 sets the mode as stop, normal, dump or diagnostic 700. If normal mode is selected 701 then the controller proceeds to 702 and this portion was described earlier. However, if the processor 602 wishes to perform diagnostics it first calls for a dump 730 in which all the control registers are read 732. Then the controller stops 734. The processor 602 then commands a diagnostic 740 which is performed 742, and the report bytes are generated and reported to the main processor 746. The controller stops 748 and awaits the next command.

We claim:

1. A crossed radiant beam x-y coordinate detection and encoder system including a plurality of emitter and detector pairs along each axis comprising:
   means for scanning a display space with crossed light beams;
   means for detecting interruption of said light beams;
   means for repeatedly reporting coordinates associated with said interrupted light beams which are present over a series of display space scans at preselected display space scan intervals, said reporting means comprising means for reporting immediately when said interrupted beams have disappeared; and
   means for locking out repeated reportings of continuously present interrupted beams and said disappearance of said interrupted beams beyond the initial reporting of the coordinates of interrupted beams for interrupted beams located in preselected positions in said display space.

2. The system of claim 1 wherein said preselected scan intervals comprises an initial first scan interval equal to T1 and subsequent scan intervals equal to T2.

3. The system of claim 1 wherein said reporting means further comprises means for reporting the minimum and maximum coordinates of said interrupted beams for each axis.

4. The system of claim 1 wherein said reporting means further comprises means for reporting an average coordinate along each axis for said interrupted beams.

5. The system of claim 3 wherein said system further comprises means for reporting an error when the number of interrupted beams along either of said axes is too small or too large.

6. The system of claim 3 wherein said system further comprises means for reporting an error when said interrupted beams are discontinuous between the minimum and maximum coordinates along either axis.

7. The system of claim 4 wherein said system further comprises means for reporting an error when the number of interrupted beams along either of said axes is too small or too large.

8. The system of claim 1 wherein said system further comprises:
   diagnostic means for checking the operation of each emitter/detector pair.

9. The system of claim 8 wherein said diagnostic means further comprises means operating at a reduced emitter output level to check marginal performance of said system.

10. The system of claim 1 wherein said system further comprises:
    diagnostic means for checking the scan speed of said system.

* * * * *